(12) United States Patent
Funk et al.

(10) Patent No.: US 6,314,561 B1
(45) Date of Patent: Nov. 6, 2001

(54) INTELLIGENT CACHE MANAGEMENT MECHANISM

(75) Inventors: Mark Robert Funk; Steven Raymond Kunkel; Mikko Herman Lipasti, all of Rochester, MN (US); Bilha Mendelson, Haifa (IL); Robert Ralph Roedinger; William Jon Schmidt, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/420,540

(22) Filed: Apr. 12, 1995

(51) Int. Cl.[7] .................................................. G06F 9/45
(52) U.S. Cl. ............................ 717/9; 711/137; 712/207
(58) Field of Search .................... 395/700; 717/5, 717/6, 7, 8, 9; 712/207, 211, 213, 237–239, 232, 233, 240; 711/141, 137, 144, 145

(56) References Cited

U.S. PATENT DOCUMENTS

| 4,885,680 |   | 12/1989 | Anthony et al. | 395/700 |
|---|---|---|---|---|
| 5,185,878 | * | 2/1993 | Baror et al. | 39/425 |
| 5,303,377 |   | 4/1994 | Gupta et al. | 395/700 |
| 5,339,419 |   | 8/1994 | Chan et al. | 395/700 |
| 5,355,491 | * | 10/1994 | Lawlor et al. | 395/700 |
| 5,371,865 | * | 12/1994 | Aikawa et al. | 395/400 |
| 5,404,484 | * | 4/1995 | Schlansher et al. | 395/425 |

OTHER PUBLICATIONS

Heisch, R.R., "Handling Branch and Link Instructions During Trace Directed Program Restructuring", IBM Technical Disclosure Bulletin, V. 37, No. 4B, Apr. 1994, pp. 189–192.

Callahan, D.; Kennedy, K.; Porterfield, A., "Software Prefetching", SIGPLAN Not. (USA), vol. 26, No. 4, Apr. 1991, pp. 40–52.

John,Lizy K., "Comparative Evaluation of Software Techniques to Hide Memory Latency", Architecture, vol. 1, Jan. 1995, pp. 229–238.

Yamada, Y. et al., "Data Relocation and Prefetching for Programs With Large Data Sets", IEEE/ACM International Symposium on Micorarchitecture, 27th, San Jose, Nov. 30–Dec. 1994, pp. 118–127.

* cited by examiner

Primary Examiner—Kakali Chaki
(74) Attorney, Agent, or Firm—Steven W. Roth (57) ABSTRACT

The data cache management mechanism of the present invention is created by an optimizing compiler. The optimizing compiler intelligently places non-blocking preload instructions into the instruction stream of the computer system so as to minimize both the frequency and detrimental effect of cache misses. The non-blocking preload instructions are placed into the instruction stream based on the existence of predictor constructs that foretell what information the processor will need and when it will need it. As a result, cache misses are either avoided entirely or reduced in severity.

4 Claims, 9 Drawing Sheets

FIG. 1

Class Definition for object Cat 200

```
class Cat {
  private:
    name:      String;       202
    breed:     BreedOfCat;   204
    attitude:  Attitude;     206 public:
                             210
    void reactTo (Person& p)  {... if (attitude == Grumpy) hiss();
                                   else purr(); ...}
    void hiss(void);    215
    void purr(void);    220
};
```

Client Program 230

```
main () {
             235
  Cat    Luke;
  Person Visitor;   240

245
  Luke -> reactTo(Visitor);
  .
  .
};
``` reactTo Method Program 260

```
Cat :: reactTo(Person& p) {
  .
       270
  if (this -> attitude == Grumpy)
     hiss();    275
  else
     purr();    280
  .
  .
};
```

```
proc  main              ;; instruction stream for Client Program 230
   ...  ⎱405
* touch -24(r1)⏎410     ;; preload contents of Luke into cache memory
   ...  ⎱415
  la r3, -24(r1)⏎420    ;; load address of Luke into protocol register
  la r4, -32(r1)⏎425    ;; load addresss of Visitor into protocol register
  call Cat :: reactTo(r3, r4)  ;; call method program reactTo
                ⎱430
  ...
```

FIG. 4A

```
proc  Cat::reactTo              ;; instruction stream for reactTo method
                                ;; program 260 parm this                       ;; protocol register 3
parm p                          ;; protocol register 4
    . . .
    ld r20, 16(r3)              ;; load this -> attitude
    cmpi r29,1                  ;; check if grumpy
    bne label 1                 ;; branch to label 1 if attitude not grumpy
    call Cat::hiss              ;; cause Luke to hiss
    b label 2                   ;; branch past purr
label 1:
    call Cat::purr              ;; cause Luke to purr
label 2:
    . . .
```

INTELLIGENT CACHE MANAGEMENT MECHANISM

FIELD OF THE INVENTION

The present invention relates to data processing systems. More particularly, the present invention relates to memory management in a computer system.

BACKGROUND OF THE INVENTION

The development of the EDVAC computer system of 1948 is often cited as the beginning of the computer era. While there have been many advances in technology since 1948, modem day computer systems still use much of the same basic componentry that was used in the EDVAC device. Two basic components that are still found in most every system are the computer system processor and its memory. The processor is the active palr of the computer system; it reads and processes information stored in the computer system's memory to perform the task assigned to it by the computer system user. While the speed at which a computer system can respond to its user's requests has always been a factor in consumer purchase decisions, computer system speed has never been as important as it is in today's marketplace. Consumers want computer systems that are fast enough to easily handle work-intensive computer programs that leverage modem day advanced technologies (e.g., multimedia and object oriented technology). Therefore, computer system manufacturers are constantly striving to make their computer systems faster and faster.

One well known way to make a computer system faster is through the use of special memory called data cache memory. Cache memory is special because a processor can retrieve information from cache memory much faster than it can from standard memory (called main memory). However, this speed is not without cost. Cache memory is significantly more expensive than main memory. Consequently, computer system designers balance the need for speed against the cost of cache memory by keeping the size of cache memory relatively small when compared to that of main memory.

The key, then, is to make sure that small but fast cache memory always contains the information needed by the processor. However, since cache memory is typically much smaller than main memory, the computer system must be able to move information from the slower main memory into the faster cache memory before the information is needed by the processor. A "cache miss" is said to occur when the processor is forced to wait because the correct information was not present in the cache memory when it was needed by the processor. Of course, the value of any given cache management mechanism is measured by how successful the mechanism is at preventing cache misses. Cache misses are increasingly becoming a major performance impediment because processor speed is increasing much more rapidly than that of memory, which means that in most cases it is the slowness of memory that stands in the way of better performance. In other words, it does not matter how fast a processor can process information if the processor has to wait to get the information it needs. It is no surprise, then, that the mechanisms used to reduce the frequency of cache misses, and their associated speed penalty, have become extremely important to the computer industry.

Many advanced computer system architectures include an instruction (sometimes called a touch or preload instruction) that can be placed in the instruction stream of a computer system to move information from main memory into data cache memory. When a preload instruction executes, it takes a previously generated main memory address and causes the movement of the associated information. However, the problem is not the actual ability to move the information into data cache memory, but is instead knowing what information to move and when to move it. Indeed, unintelligent use of preload instructions may even hinder rather than improve computer system performance. For example, an unintelligent mechanism that merely arbitrarily inserted preload instructions near all instructions that actually reference/load information is, in most cases, ineffective because the timing is such that there is not usually adequate time to load much of the needed information into data cache memory before the actual reference takes place. A crude mechanism of this sort would add a tremendous number of preload instructions, most of which would be of minimal usefulness. In fact, it has been shown that the resulting increase in code size (called "code bloat") actually worsens computer system performance instead of improving it (i.e., due to the negative impact on instruction cache and main memory paging performance).

One intuitive solution to this timing problem might be a mechanism that attempted to ensure adequate time by merely inserting preload instructions a certain number of instructions up the stream of instructions from the instructions that actually reference/load the information. However, an unintelligent mechanism of this sort is likewise of limited value because the address needed by the preload instruction (i.e., the address of the information) may not yet have been generated when the preload instruction is due to execute.

An additional problem with mechanisms of this sort is the potential overuse of preload instructions. Overuse of preload instructions can be problematic not only because of code bloat but also because overuse greatly increases the likelihood that useful information will be unnecessarily cast out of data cache memory (i.e., because data cache memory is only so big) before it is needed by the processor. This problem is known as "cache thrashing".

While somewhat helpful, existing mechanisms for preventing cache misses tend to be crude and unintelligent. Indeed, some mechanisms may even cause more harm than good by introducing unwanted side-effects such as code bloat and cache-thrashing. Without an intelligent mechanism that reduces both the frequency and cost of cache misses, the computer industry will never be able to fully realize the benefits of today's faster processors.

SUMMARY OF THE INVENTION

It is, therefore, a principal object of this invention to provide an enhanced mechanism for reducing the frequency and cost of cache misses.

It is another object of this invention to provide an enhanced mechanism that intelligently inserts preload instructions into the computer system's instruction stream to help ensure that needed information is in data cache memory before it is referenced by the processor.

It is still another object of this invention to provide an enhanced compiler mechanism that inserts preload instructions into the computer system's instruction stream whenever it determines, based on the existence of a program construct that foretells what information the processor will need and when the processor will need that information, that the benefits associated with the use of a preload instruction outweigh the cost of that use.

It is yet another object of this invention to provide an enhanced compiler mechanism that inserts preload instructions into the computer system's instruction stream whenever it encounters a pointer argument being passed as part of a method call in an object oriented programming environment.

It is still another object of this invention to provide an enhanced compiler mechanism that inserts preload instructions into the computer system's instruction stream whenever it encounters a pointer argument being passed as part of a procedure call.

It is still another object of this invention to provide an enhanced compiler mechanism that inserts preload instructions into the computer system's instruction stream whenever it encounters an instruction that loads a Table of Contents pointer.

These and other objects of the present invention are accomplished by the data cache management mechanism disclosed herein.

The data cache management mechanism of the present invention is created by an optimizing compiler. The optimizing compiler intelligently places non-blocking preload instructions into the instruction stream of the computer system so as to minimize both the frequency and detrimental effect of cache misses. A preload instruction is considered "non-blocking" if the processor is free to process other instructions while the needed information is being loaded into data cache memory. As discussed, preload instructions are used to move information from main memory into cache memory. When a preload instruction executes, it takes a previously generated main memory address and causes the associated information to be moved from main memory into data cache memory. As also mentioned, though, the problem is not the actual ability to move the information, but is instead knowing what information to move and when to move it.

Through inspection of the instruction stream, the compiler of the present invention detects the existence of certain instruction stream constructs that foretell the information that the processor will need and when the processor will need the information (referred to hereafter as predictor constructs). Typically, predictor constructs explicitly or implicitly necessitate the presence of two other types of instruction stream constructs. These latter two instruction stream constructs usually perform two functions: 1) the loading or calculation of an address (referred to hereafter as address generation constructs) and 2) use of the generated address to gain access to the information needed by the processor (referred to hereafter as data load constructs). Of course, an address generation construct may be followed by more than one data load construct.

The intelligent compiler of the present invention inserts non-blocking preload instructions into an instruction stream when it determines, based on detection of a predictor construct, that the benefits associated with the use of the preload instruction outweigh the costs associated with that use. More specifically, the compiler inserts preload instructions into the computer system's instruction stream when it encounters a predictor construct because it knows that the associated address generation construct is definitely, or statistically likely to be, far enough up the stream of instructions from the associated data load construct to permit the data cache memory to be fully or partially loaded before the information is needed by the processor (i.e., via execution of the data load construct). As a result, a cache miss is either entirely avoided or reduced in severity.

DESCRIPTION OF THE PREFERRED EMBODIMENTS

OVERVIEW

For those individuals who are not compiler experts and/or not experts in object oriented technology, a brief overview of compilers, object oriented technology, and the mechanisms of the present invention is presented here.

Statements, Instructions, Compilers

Computer programs are constructed using one or more programming languages. Like words written in English, a programming language is used to write a series of statements that have particular meaning to the drafter (i.e., the programmer). Once the programmer has drafted their computer program in the human readable form (called source code) prescribed by the programming language, the computer programmer uses mechanisms that change the human readable form of the computer program into a form that can be understood by a computer system (called machine readable form). These mechanisms are typically called compilers; however it should be understood that the term "compiler", as used within this specification, generically refers to any mechanism that transforms one representation of a computer program into another representation of that program.

Figure 2:
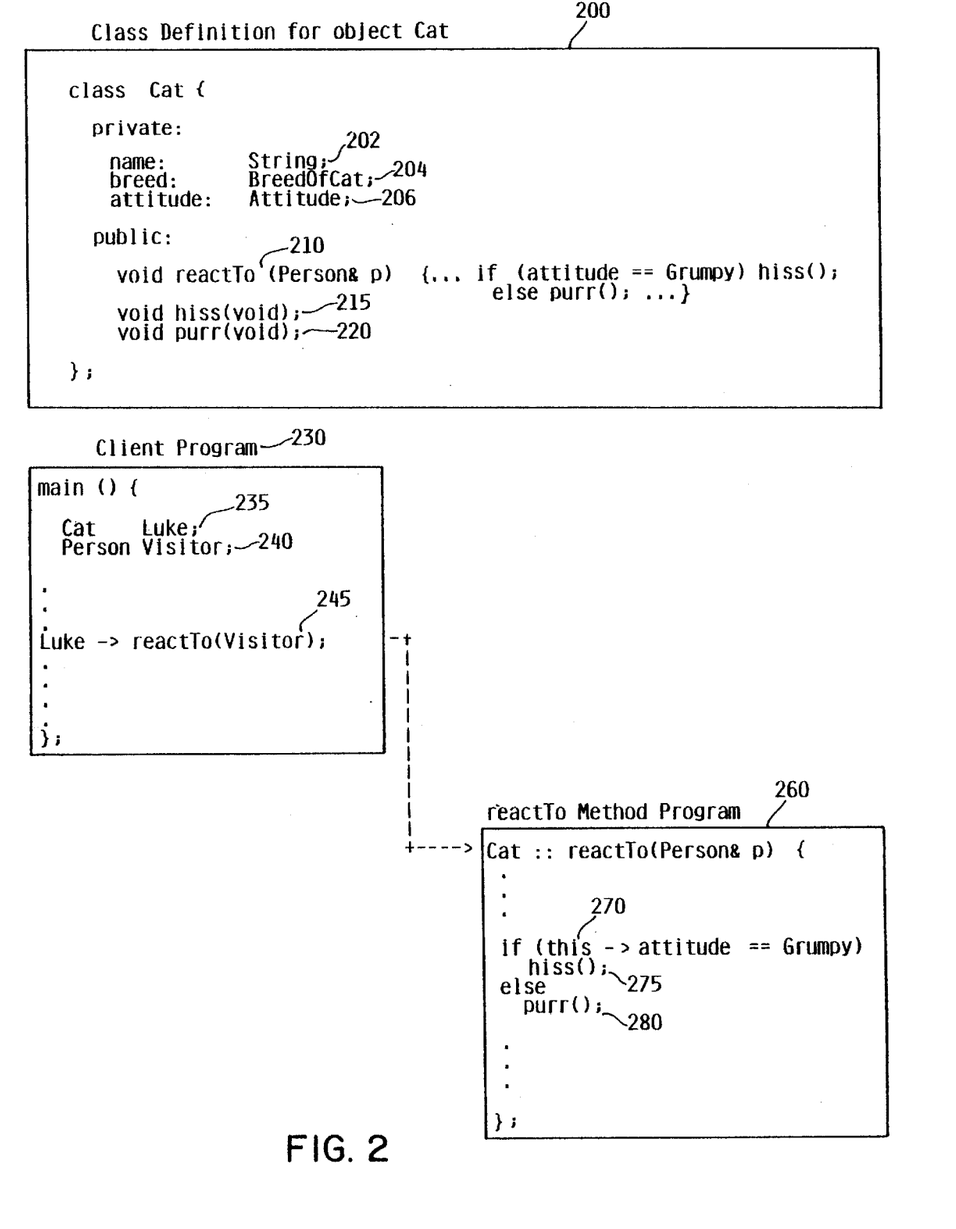
FIG. 2 is a diagram of example source code for an example client program and for an example method program.
Figure 4A:
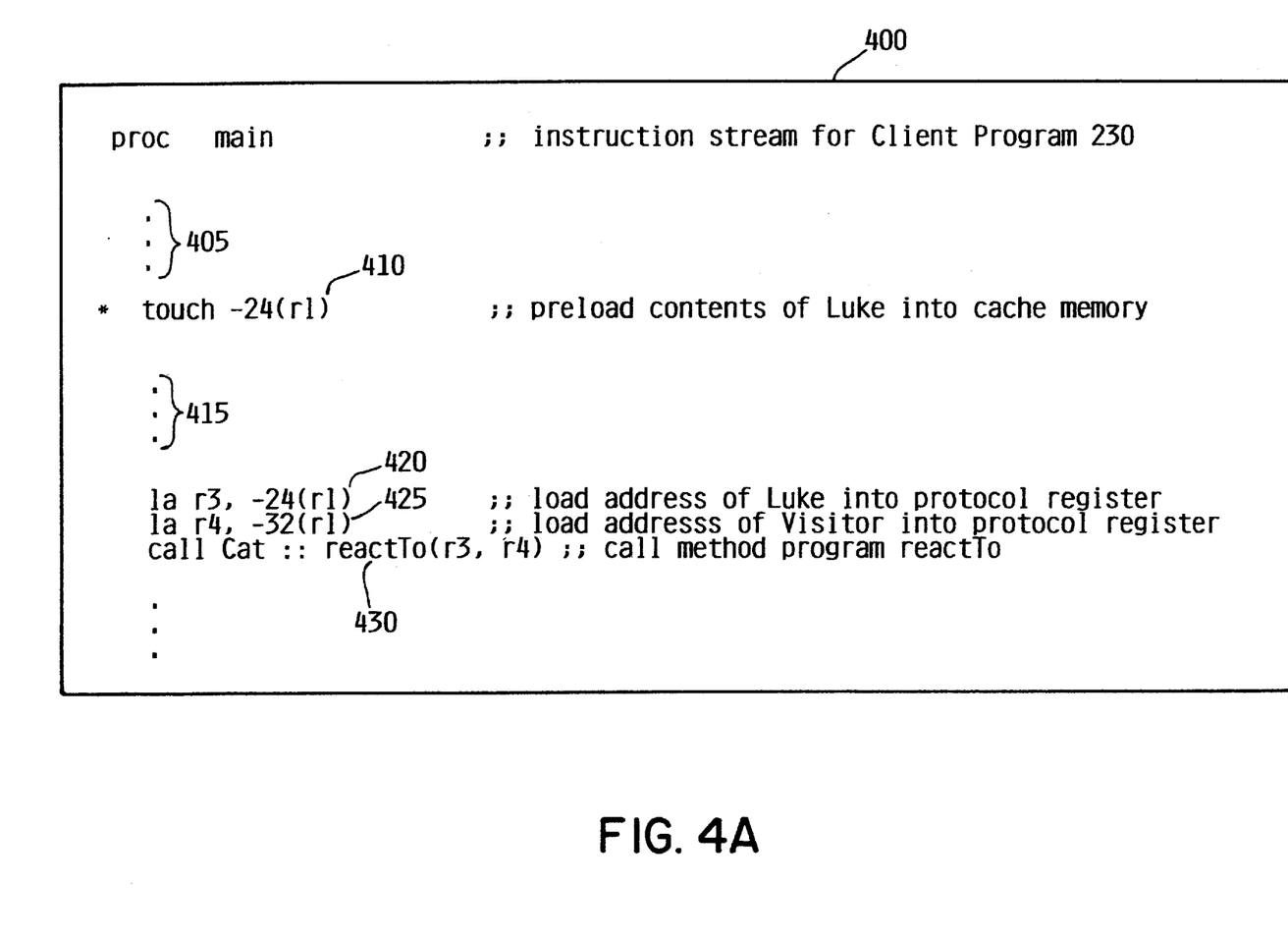
FIG. 4 is a diagram showing example instruction streams for the client and method programs of FIG. 2.
Figure 4B:
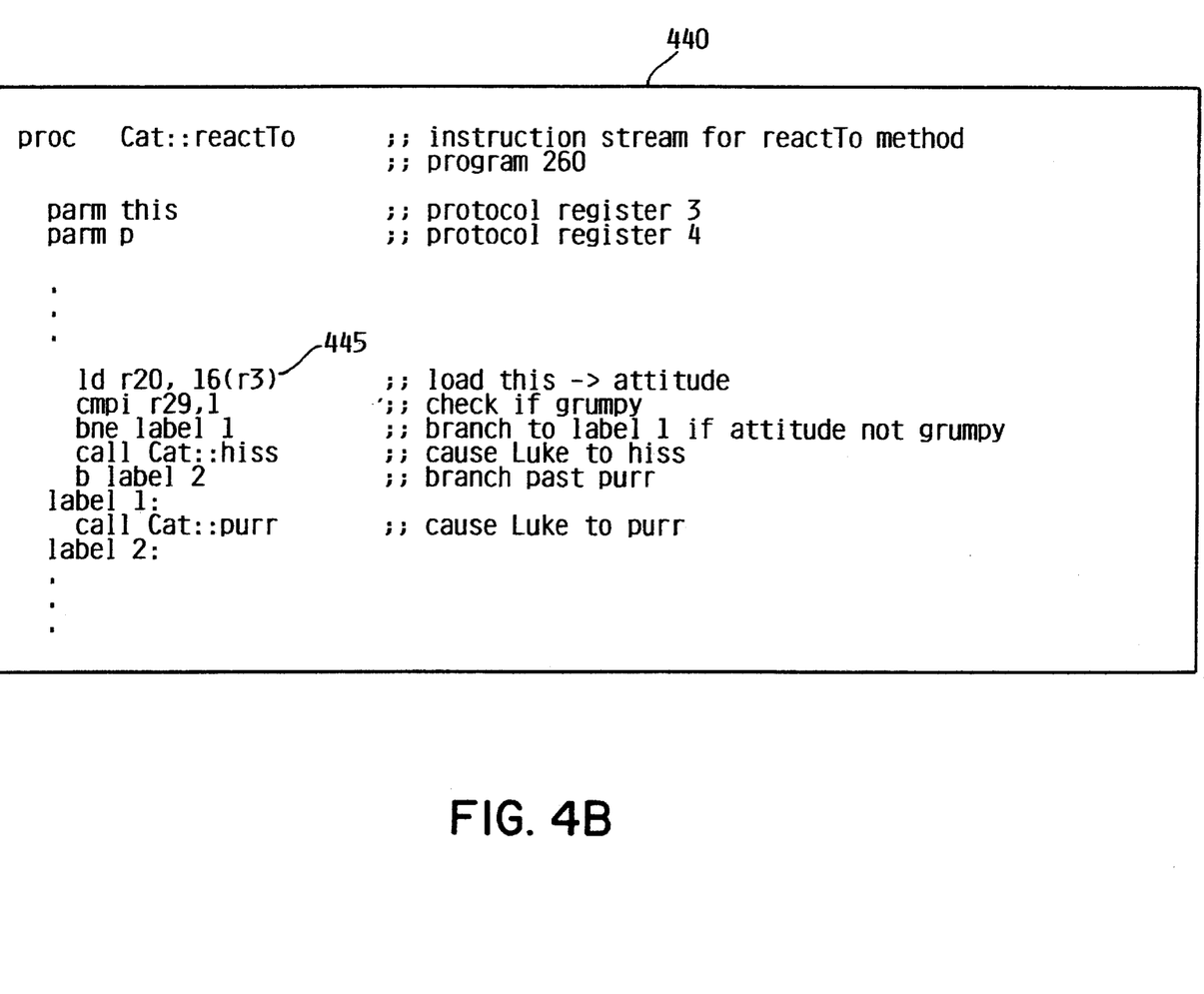

This machine readable form, within this specification, is a stream of binary instructions (i.e., ones and zeros) that are meaningful to the computer. The compiler typically compiles each human readable statement into one or more machine readable instructions. Often times, these instructions have what are called mnemonics associated with them. Mnemonics are used to allow computer programmers to determine the exact instructions that are being generated by the compiler for each statement. FIG. 2 shows example statements and FIG. 4 shows example mnemonic instructions. Special compilers, called optimizing compilers, operate on the instruction stream to make it perform better (e.g., by eliminating unneeded instructions etc.). Some optimizing compilers are wholly separate while others are built into a primary compiler (i.e., the compiler that converts the human readable statements into machine readable form) to form a multi-pass compiler. In other words, multi-pass compilers first operate to convert source code into an instruction stream (i.e., as a first pass or stage) and then operate on the instruction steam to optimize it (i.e., as a second pass or stage).

Object Oriented Technology

Not surprisingly, objects are central to Object Oriented technology. Objects can be thought of as autonomous agents which work together to perform the tasks required of the computer system. A single object represents an individual operation or a group of operations that are performed by a computer system upon information controlled by the object. The operations of objects are called "method programs" and the information controlled by objects is called "object data" or just "data" Method programs and object data are said to be "encapsulated" in the object.

The only way a client program can access the data controlled by a particular object is by calling one of the method programs owned by that object. Hence, one of the primary responsibilities of method programs is providing client programs with information controlled by their objects.
Mechanisms of the Present Invention As discussed in the Summary section, the mechanisms of the present invention use the predictor constructs to create an optimized instruction stream for execution on a computer system. While those skilled in the art will appreciate that the present invention is not limited to any particular predictor construct, the call and the table of contents program statements are two present day predictor constructs that provide good illustrative examples of the benefits and advantages of the present invention.

A method program call (i.e., a call statement in object oriented programming terminology) occurs when a client program in an object oriented programming environment wants to gain access to information controlled by the object that owns the method program. The existence of a method program call predictor construct implies 1) that the address of the needed information must have been generated prior to the method program call itself (i.e., via an address generation construct) and 2) that the information identified by the address will be accessed (i.e., via at least one data load construct) far enough down the stream of instructions to make use of the preload instruction worthwhile. In other words, the intelligent mechanism of the present invention makes use of the fact that pointers passed as part of method program call constructs are 1) highly likely to be dereferenced during execution of the method program and 2) highly likely to be dereferenced far enough down the stream of instructions to make preloading the data cache memory worthwhile. Indeed, since the very purpose of method programs is to operate on their objects, it would be rare for a method program not to dereference a passed pointer sometime during execution.

Another example of the benefits and advantages of the present invention is the processing of Table of Contents (TOC) pointers. TOC pointers, which are stored in a TOC structure, contain addresses to information that is frequently referenced during execution of an instruction stream. TOC pointers are typically generated once and then used (i.e., dereferenced) many times thereafter. (In this case, the word "generated" means retrieved from the TOC structure.) Therefore, the intelligent mechanism of the present invention places non-blocking preload instructions immediately after the instructions that load the TOC pointers from the TOC structure. This helps ensure that the needed information either 1) resides in cache memory or 2) is in the process of being loaded into cache memory before being needed by the processor.

In operation, the processor executes the preload instruction causing a message to be sent to the data cache circuitry asking whether the information stored at the memory location referenced in the preload instruction resides in data cache memory. If the data cache circuitry determines that the information is not in data cache memory, it sends a request to the memory controller instructing the memory controller to begin loading the needed information into data cache memory. Since execution of the preload instruction occurs before the referenced information is actually needed by the processor, the memory controller is able to load the needed information into data cache memory while the processor continues to perform other useful work.

DETAILED DESCRIPTION

Figure 1:
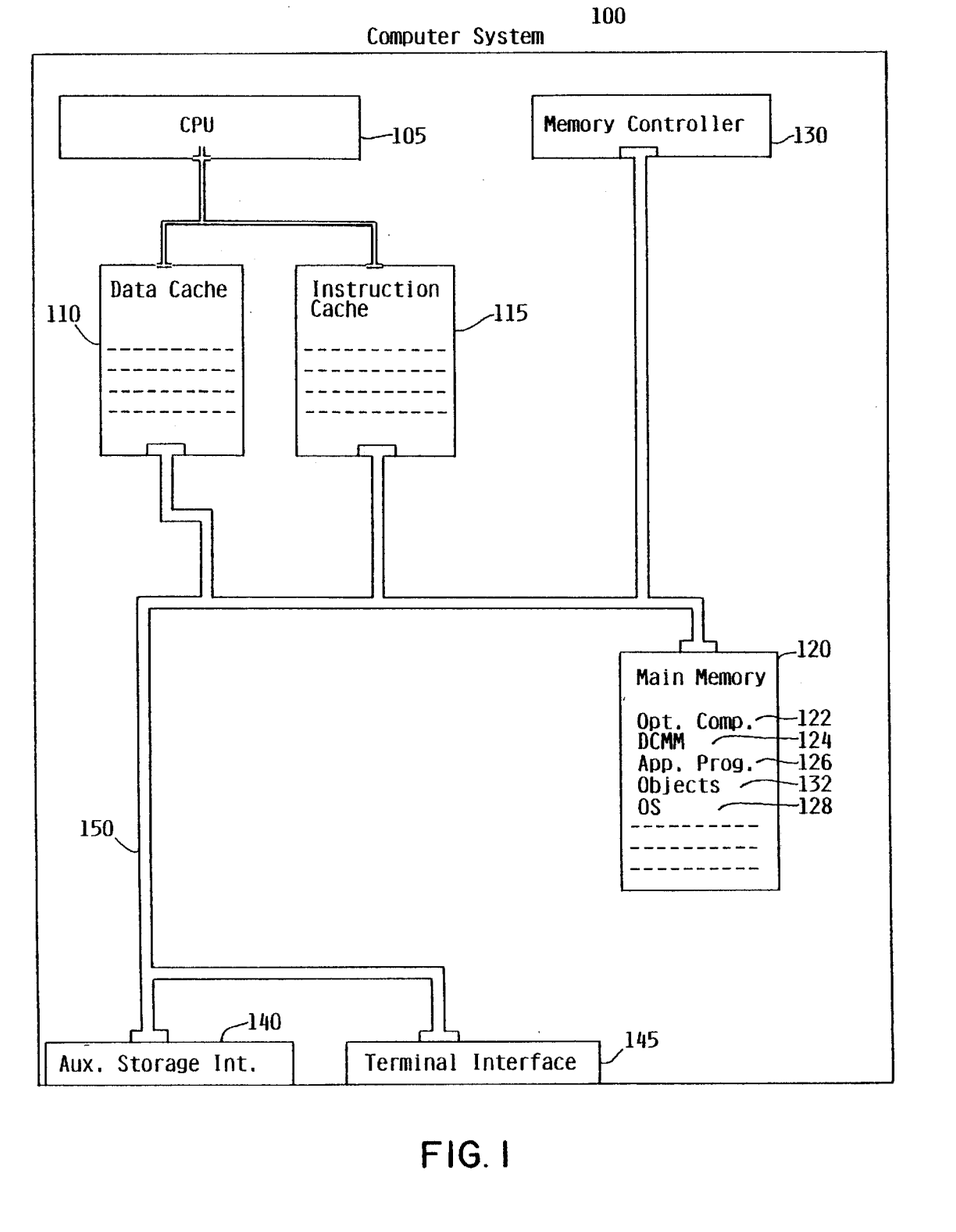
FIG. 1 is a block diagram of the computer system of the preferred embodiment.

FIG. 1 shows a block diagram of the computer system of the present invention. The computer system of the preferred embodiment is an enhanced IBM AS/400 mid-range computer system. However, those skilled in the art will appreciate that the mechanisms and apparatus of the present invention apply equally to any computer system, regardless of whether the computer system is a complicated multi-user computing apparatus or a single user device such as a personal computer or workstation. As shown in the exploded view of FIG. 1, computer system 100 comprises main or central processing unit (CPU) 105 connected to system bus 150 via data cache 110 and instruction cache 115. Main memory 120, memory controller 130, auxiliary storage interface 140, and terminal interface 145 are also shown to be connected to system bus 150.

Data cache 110 is made up of data cache circuitry (not shown) and specialized memory. The data cache circuitry is responsible for managing the contents of data cache 110, as well as managing data traffic to and from CPU 105 and system bus 150. Like data cache 110, instruction cache 115 is used to make computer system 100 faster. The difference is that instructions are preloaded into instruction cache 115 instead of information. The present invention involves data cache 110, not instruction cache 115. Auxiliary storage interface 140 is used to allow computer system 100 to store and retrieve information from auxiliary storage such as magnetic disk or optical storage devices. Memory controller 130, through use of a processor separate from CPU 105, is responsible for moving requested information from main memory 120 and/or through auxiliary storage interface 140 into data cache 110. While for the purposes of explanation, memory controller 130 is shown as a separate entity, those skilled in the art understand that, in practice, portions of the function provided by memory controller 130 may actually reside in the circuitry associated with data cache 110 and main memory 120. Further, while memory controller 130 of the preferred embodiment is described as having responsibility for moving requested information from main memory 120 and/or through auxiliary storage interface 140 into data cache 110, those skilled in the art will appreciate that the mechanisms of the present invention apply equally to any storage configuration, regardless of the number and type of the storage entities involved. For example, the present invention applies equally to multi-level data cache mechanisms as well as single level data cache mechanisms like data cache 110, and applies equally in a computer system having a combined instruction/data cache at any level of the storage hierarchy.

Terminal interface 145 allows system administrators and computer programmers to communicate with computer system 100, normally through programmable workstations. Although the system depicted in FIG. 1 contains only a single main CPU and a single system bus, it should be understood that the present invention applies equally to computer systems having multiple main CPUs and multiple I/O buses. Similarly, although the bus of the preferred embodiment is a typical hardwired, multidrop bus, any connection means that supports bidirectional communication could be used.

Main memory 120 contains Optimizing Compiler 122, Data Cache Management Mechanism (DCMM) 124, Application Programs 126, Objects 132, and Operating System 128. While DCMM 124 is shown as a separate entity, so as to represent the optimized instruction stream of computer system 100, those skilled in the art will understand that parts of DCCM 124 are present in all mechanisms that were compiled using Optimizing Compiler 122. Further, while Optimnizing Compiler 122 is shown to reside on computer system 100, those skilled in the art will understand that the present invention applies equally to compilers that execute on one computer system but create mechanisms that themselves execute on a different, target computer system. Compilers of this type are known as cross compilers.

As stated, main memory 120 contains Optimizing Compiler 122, Data Cache Management Mechanism (DCMM) 124, Application Programs 126, Objects 132, and Operating System 128. However, it should be understood that main memory 120 will not necessarily always contain all parts of all mechanisms shown. For example, portions of application programs 126 and operating system 128 will typically be loaded into instruction cache 115 to execute, while other files may well be stored on magnetic or optical disk storage devices (not shown).

The remainder of this specification describes how the present invention processes two particular instruction stream constructs (i.e., method program calls and TOC pointer dereferences) However, those skilled in the art will appreciate that the present invention applies equally to any instruction stream construct or construct combination that defines a situation(s) where an address load event is far enough up-stream from the actual address reference that the benefit associated with the use of the preload instruction outweighs the cost associated with that use.

Method Program Calls

FIG. 2 shows an example class definition for an example object, cat class definition 200. FIG. 2 also shows example client program 230 and example method program 260. Cat class definition 200, client program 230, and method program 260 will be used throughout the remainder of this specification to show how Optimizing Compiler 122 and DCMM 124 provide significant speed benefits to computer system 100. Before proceeding with further explanation of the advantages and benefits of the present invention, however, it is important to point out that while these example mechanisms were created using the C++ computer language, those skilled in the art will appreciate that the present invention applies equally to all programming languages, regardless of whether the language is considered an object oriented language such as C++.

As shown in FIG. 2, each object created from cat class definition 200 will have a name (i.e., name 202), a breed (i.e., breed 204), and an attitude (i.e., attitude 206). Each object created from cat definition 200 will also contain method programs reactTo 210, hiss 215, and purr 220.

A client program that made use of an object created using cat class 200 will, at a minimum, contain the statements shown in client program 230. Declaration statement 235 is used to actually create an object from cat class definition 200. The object in this case is fictitiously named Luke. Declaration statement 240 creates an object of type person, called Visitor. Call statement 245 is an invocation of reactTo method program 260. Again, while example call statement 245 was written using the C++ programming language, those skilled in the art will appreciate that the present invention applies to all call statements, regardless of whether they were written using an object oriented programming language such as C++. Accordingly "call statement" is generically defined herein to refer to all call statements, regardless of the programming language used.

reactTo method program 260 includes person pointer 265 (i.e., the address of Visitor in this case), this pointer 270, call statement 275 to hiss method program, and call statement 280 to purr method program. This pointer 270 is the C++ version of an implicit object pointer that is automatically passed in all object oriented environments. It makes tremendous sense to automatically pass object pointers in object oriented implementations because method programs that are defined as part of a class (e.g., method program definition 210) will always be used to operate on the objects for which they were defined.

Figure 3:
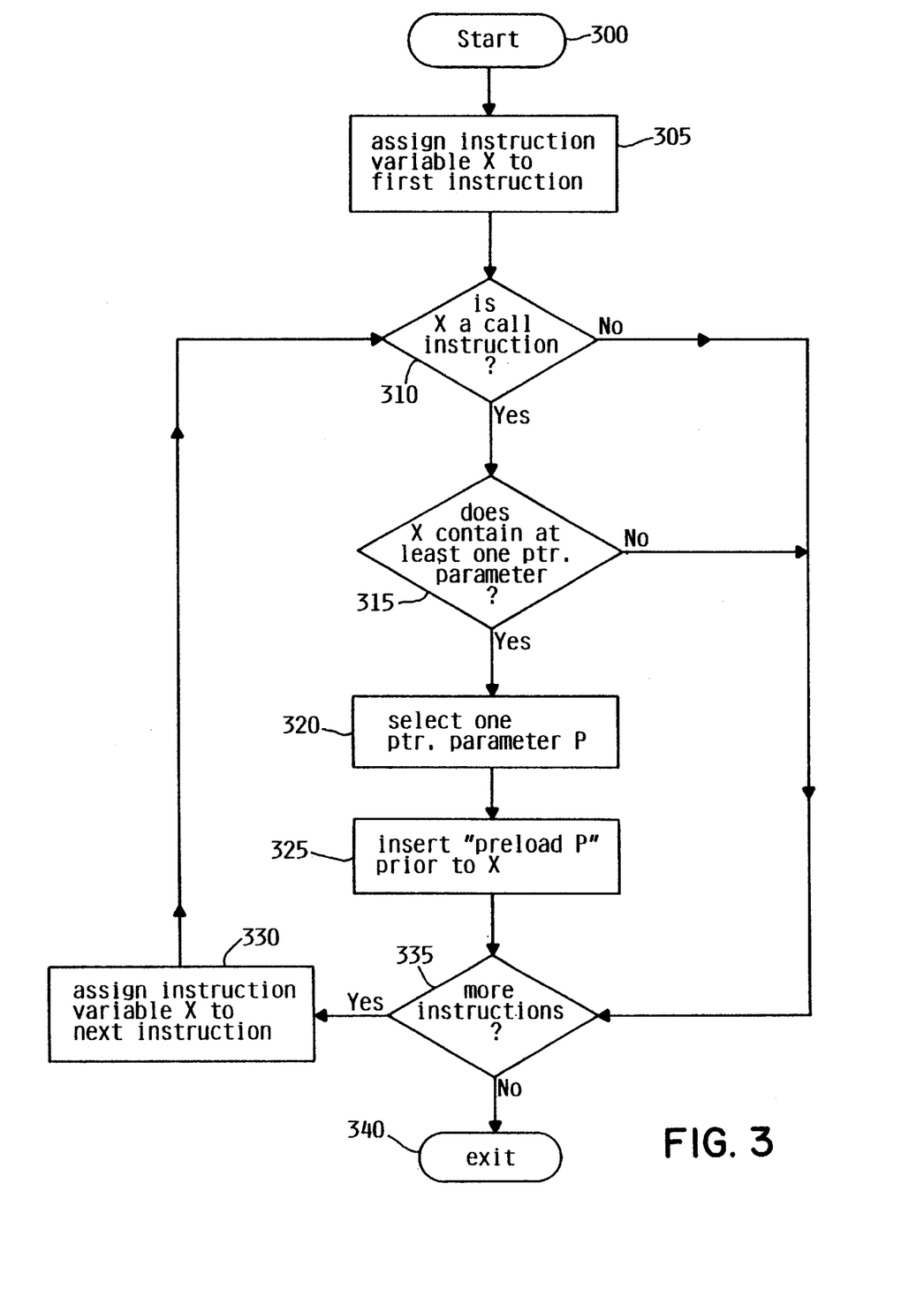
FIG. 3 is a flow diagram of an optimizing compiler constructed to carry out steps according to the preferred embodiment for processing the call statement predictor construct.

FIG. 3 is a flow diagram of an optimizing compiler constructed to carry out steps in accordance with the preferred embodiment for processing the call statement predictor construct. Optimizing Compiler 122 starts in block 300. In block 305, Optimizing Compiler 122 begins to examine a preexisting instruction stream. As mentioned, Optimizing Compiler 122 may be incorporated into an existing multi-pass compiler or it could be a stand alone compiler. The present invention applies equally to both types of compilers. After assigning instruction variable X to the first instruction in the previously generated instruction stream [block 305], Optimizing Compiler 122 determines whether the instruction is a call instruction [block 310]. If Optimizing Compiler 122 determines that the instruction assigned to instruction variable X is not a call statement, Optimizing Compiler 122 next determines whether there are additional instructions [block 335]. If there are not additional instructions, Optimizing Compiler 122 terminates execution in block 340. Otherwise, Optimizing Compiler 122 assigns the next instruction to instruction variable X and returns to block 310 to repeat the process.

If, in block 310, Optimizing Compiler 122 determines that the instruction assigned to instruction variable X is indeed a call instruction, Optimizing Compiler 122 next determines whether the instruction at issue contains at least one pointer parameter [block 315]. If the call instruction does not contain at least one pointer parameter, Optimizing Compiler 122 proceeds to block 335 and continues as was previously described. If Optimizing Compiler 122 determines that the call instruction does contain at least one pointer parameter, Optimizing Compiler 122 selects one pointer parameter and assigns it to pointer variable P [block 320]. For simplicity of explanation, Optimizing Compiler 122 of the preferred embodiment selects only a single pointer parameter; however, those skilled in the art will appreciate that the present invention is not limited to selection of only a single pointer parameter, and that selection of any number of pointer parameters is well within the spirit and scope of the present invention.

Once a pointer parameter has been selected, Optimizing Compiler 122 then inserts a preload instruction for P into the instruction steam at a point prior to call instruction X (i.e., "up stream" from the call instruction) [block 325]. Optimizing Compiler 122 then proceeds to block 335 and continues as has been previously described.

By way of example, assume that the C++ source code shown on FIG. 2 has been compiled into two preexisting instruction streams, instruction stream 400 for client program 230 and instruction stream 440 for reactTo method program 260 (see FIG. 4). When Optimizing Compiler 122 operates on instruction stream 400, it will encounter instructions 405, 415, 420, and 425 before detecting that instruction 430 is a call instruction. Since all object oriented call instructions include the aforementioned automatic passing of the object address (e.g., the "this" pointer in C++), Optimizing Compiler 122 will determine that call statement 430 does indeed contain a pointer parameter. Upon making this determination, Optimizing Compiler 122 will optimize instruction stream 400 by placing touch instruction 410 into instruction stream 400 at some location prior to call instruction 430. Touch instruction 410 should be placed "up stream" as far as possible so as to allow memory controller 130 adequate time to load the contents of object Luke into data cache 110.

When CPU 105 executes optimized instruction stream 400 it will encounter touch instruction 410, which will cause it to send a message to memory controller 130 instructing memory controller 130 to load the contents of the object Luke into data cache 110. Then, when CPU 105 executes instruction 445 of instruction stream 440 (i.e., when CPU 105 needs the information associated with object Luke), the contents of object Luke should be in data cache 110 or in the process of being loaded into data cache 110.

Figure 5A:
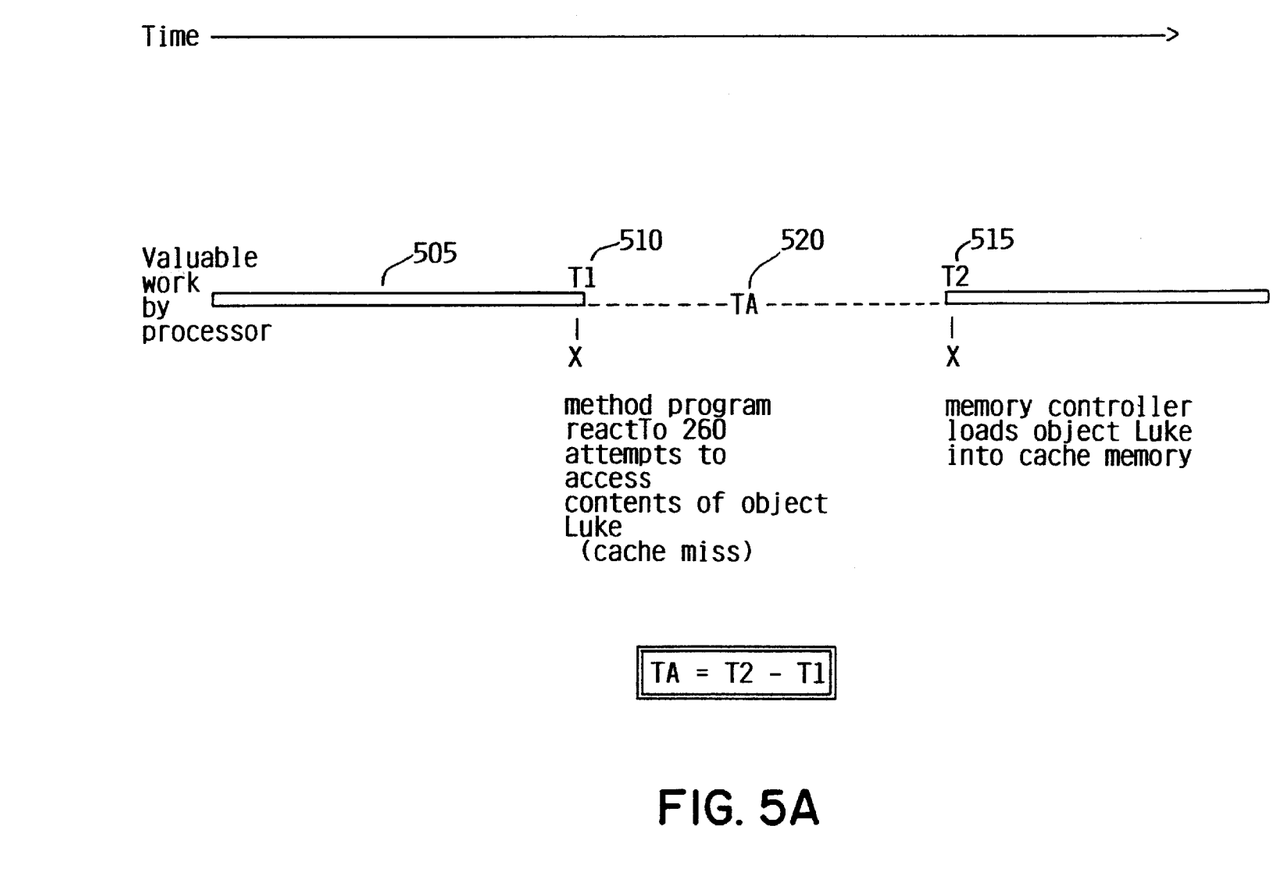
FIGS. 5A–5C are work/time diagrams showing the benefits and advantages of the present invention.
Figure 5B:
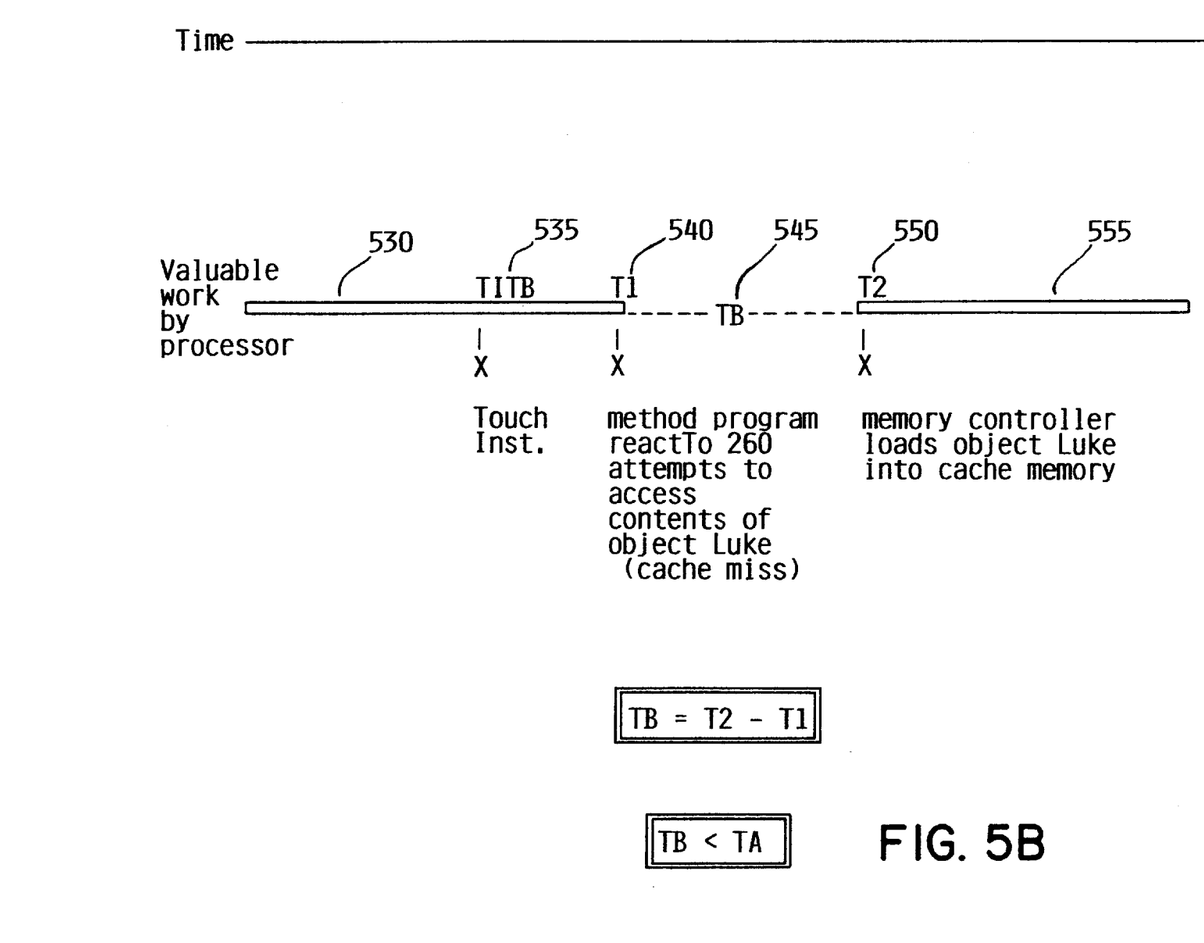
Figure 5C:
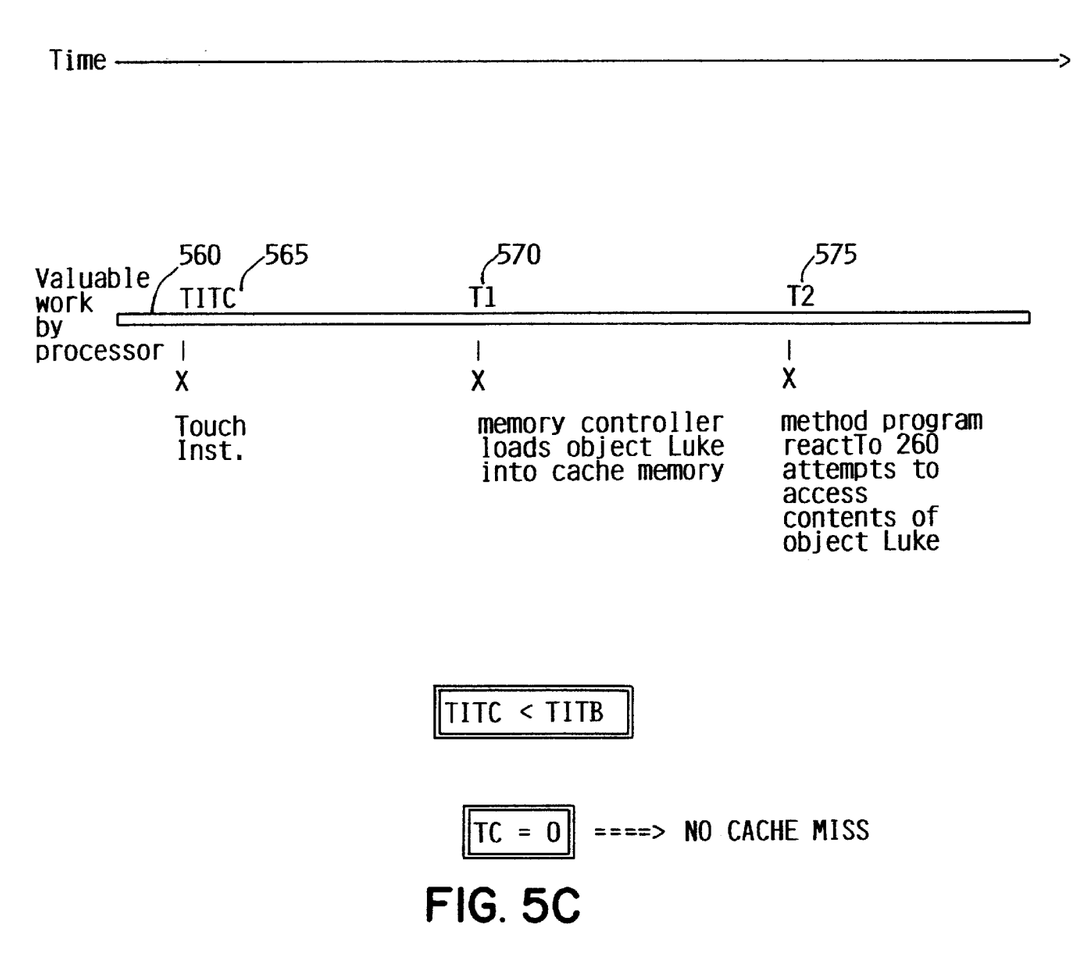

FIGS. 5A–5C are work/time diagrams showing the benefits and advantages of the present invention. Figure SA shows the effects of a cache miss without DCMM 124 of the present invention. Continuing the example of the call to reactTo method program 260 of FIG. 2, CPU 105 is doing valuable work 505 until reactTo method program 260 (in unoptimized form) attempts to access the contents of object Luke at time T 510. CPU 105 is then forced to wait for time TA 520 (i.e., time T2-T) until memory controller 130 is able to load the contents of object Luke into data cache 110. Once the contents of object Luke have been loaded, CPU 105 is again able to perform valuable work (i.e., shown as valuable work 525).

FIG. 5B shows the effects of a cache miss when DCMM 124 of the present invention is able to at least begin loading the contents of object Luke into data cache 110 before the information is needed by processor 105. In other words, this diagram shows the case where it is not possible to place the touch instruction "up stream" far enough to allow memory controller 130 to completely load the contents of object Luke into data cache 110. Continuing the example of the call to reactTo method program 260 of FIG. 2, CPU 105 is executing instruction steam 400 when it encounters non-blocking touch instruction 410 (see FIG. 4) at time TITB 535. Upon executing touch instruction 410, CPU 105 sends a message to memory controller 130 instructing it to load the information referenced in touch instruction 410 (i.e., the contents of object Luke) into data cache 130.

When CPU 105 attempts to access the contents of object Luke (i.e., instruction 445 of FIG. 4) at time T 540, CPU 105 must wait time TB 545 (i.e., time T2-T) because memory controller 130 has not yet been able to fully load the contents of object Luke into data cache 110. However, it should be noted that time TB 545 is shorter than time TA 520, which means that although CPU 105 was forced to wait, it did not have to wait as long as it would if DCMM 124 of the present invention were not present. Once the contents of object Luke have been fully loaded, CPU 105 is again able to perform valuable work (i.e., shown as valuable work 555).

FIG. 5C shows that a cache miss is completely avoided when DCMM 124 of the present invention is able to fully load the contents of object Luke into data cache 110 before the information is needed by processor 105. In other words, this diagram shows the case where it is possible to place the touch instruction "up stream" far enough to allow memory controller 130 to completely load the contents of object Luke into data cache 110. Continuing the example of the call to reactTo method program 260 of FIG. 2, CPU 105 is executing instruction steam 400 when it encounters non-blocking touch instruction 410 (see FIG. 4) at time TITC 565. Upon executing touch instruction 410, CPU 105 sends a message to memory controller 130 instructing it to load the information referenced in touch instruction 410 (i.e., the contents of object Luke) into data cache 110. Upon receiving the message memory controller 130 proceeds to load the contents of object Luke into data cache 110 by time T 570. When CPU 105 attempts to access the contents of object Luke (i.e., instruction 445) at time T2 575, the needed information already resides in data cache 110. Hence, CPU 105 is not forced to wait; the cache miss has been avoided. [Note that TITC (from FIG. 5B) occurs earlier in time than TITB.]

As mentioned, FIG. 5C shows that when possible touch instructions should be placed up stream far enough to allow memory controller 130 time to finish loading the needed information into data cache 110 prior to access by processor 105. In addition, though, use of an instruction scheduling mechanism is a further refinement of the present invention. Much like optimizing compiler 122, instruction scheduling mechanisms operate on preexisting instruction streams to make them more efficient. In general, instruction scheduling mechanisms do much what their name suggest. They move instructions around (i.e., schedule them) to achieve the best performance for the particular computer system. Use of an instruction scheduler on an instruction stream that was previously optimized by optimizing compiler 122 would further enhance the present invention by providing an additional mechanism for moving the inserted touch instructions further up stream.

TOC Pointer Dereferencing

A TOC is a structure maintained by a system link/loader. A system link/loader is responsible for binding compiled programs together into a single object code unit that can be executed on a computer system. Essentially, the TOC is a table of pointers that provides a mapping from a data aggregate's symbolic name, which is known to the compiled programs, to the data aggregate's actual address, which is not known until the compilation unit is linked with and/or loaded onto the computer system. The link loader is responsible for completing the mapping by updating the symbolic TOC entries with pointers (i.e., the TOC pointers) to the actual data aggregates in question (i.e., with each data aggregate's actual address). When one of application programs 126 needs to access a particular data aggregate, it first loads the TOC pointer, and then dereferences the pointer.

When operating on the associated instruction stream, optimizing compiler 122 will endeavor to separate the load of the TOC pointer from the actual dereference (i.e., move the load as far up-stream as possible) to reduce the number of times the TOC pointer is loaded. While such "redundant load elimination" and "code motion" technique are known in the art, optimizing compiler 122 of the present invention exploits this separation between the TOC pointer load and the actual dereference of the TOC pointer by intelligently placing non-blocking preload instructions far enough up-stream from the actual TOC pointer dereference to ensure that the addressed data aggregate will be either in data cache 110 or in the process of being loaded into data cache 110 by the time the dereferencing instruction executes on CPU 105.

Figure 6:
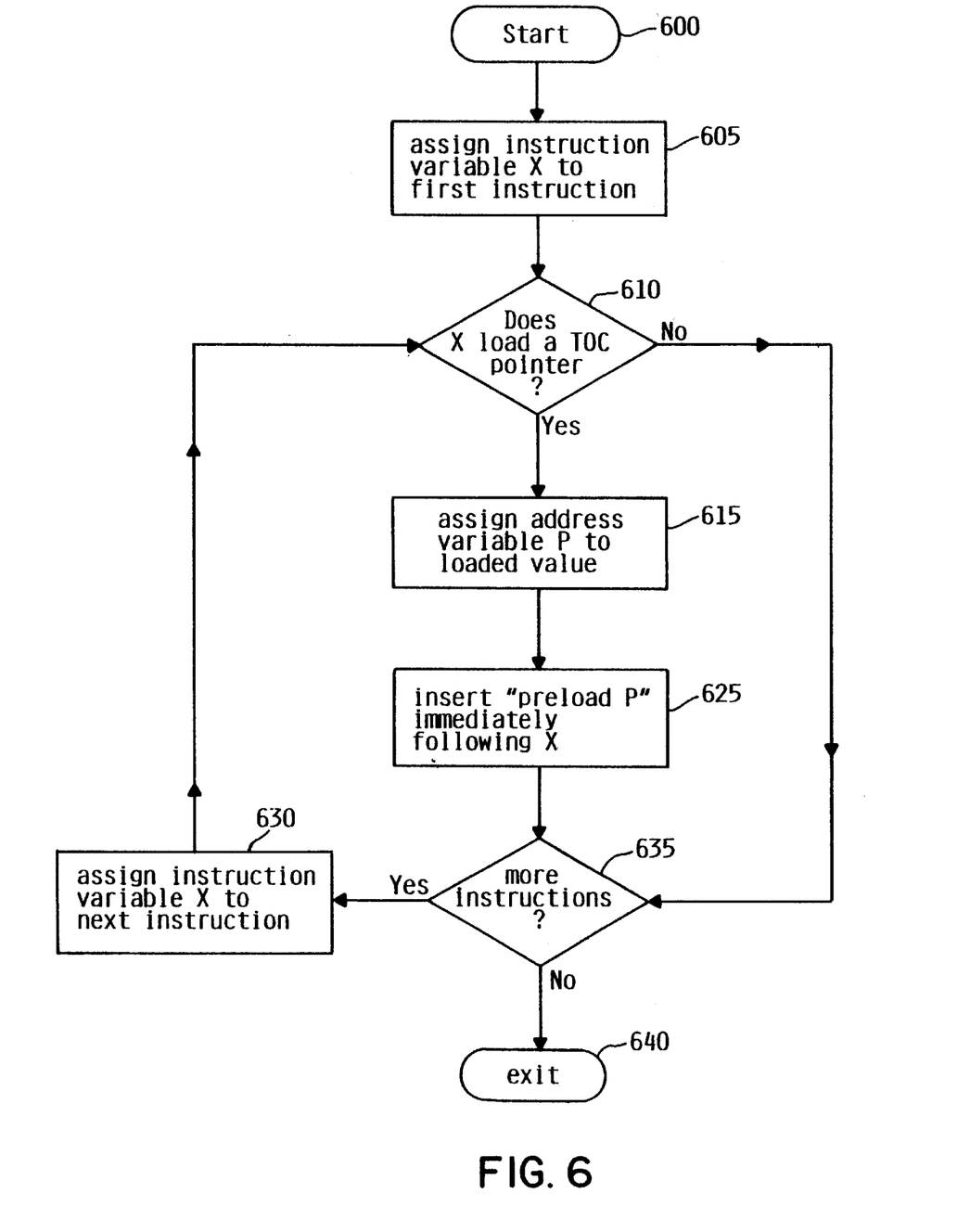
FIG. 6 is a flow diagram of an optimizing compiler constructed to carry out steps according to the preferred embodiment for processing the Table of Contents predictor construct.

FIG. 6 is a flow diagram of an optimizing compiler constructed to carry out steps in accordance with the preferred embodiment for processing the TOC pointer predictor construct. Optimizing Compiler 122 starts in block 600. In block 605, Optimizing Compiler 122 begins to examine a preexisting instruction stream. After assigning instruction variable X to the first instruction in the previously generated instruction stream [block 605], Optimizing Compiler 122 determines whether the encountered instruction is an instruction that loads a TOC pointer [block 610]. If Optimizing Compiler 122 determines that the encountered instruction is not an instruction that loads a TOC pointer, Optimizing Compiler 122 next determines whether there are additional instructions [block 335]. If there are not additional instructions, Optimizing Compiler 122 terminates execution in block 640. Otherwise, Optimizing Compiler 122 assigns the next instruction to instruction variable X and returns to block 610 to repeat the process.

If, in block 610, Optimizing Compiler 122 determines that the instruction assigned to instruction variable X is indeed an instruction that loads a TOC pointer, Optimizing Compiler 122 next assigns the address indicated in the load instruction to variable P [block 615]. Optimizing Compiler 122 then optimizes the preexisting instruction stream by inserting a preload instruction for P into the instruction steam at a point immediately following load instruction X [block 625]. Optimizing Compiler 122 then proceeds to block 635 and continues as has been previously described.

As a design note, care must be taken in cases where the TOC pointer points to data aggregates larger than a data cache line. For example, a large static data area, only parts of which are subsequently referenced, might have a single entry in the TOC. The compiler must have some knowledge of which part or parts of the area pointed to are actually referenced, and must limit the non-blocking preload instruction to instructions to prefetch only those parts. This can be accomplished by examining the offsets used in the subsequent references, and using those same offsets in the non-blocking preload instruction(s).

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A computer apparatus, said computer apparatus comprising:

a first central processing unit, said first central processing unit executing an instruction stream, said instruction stream having a first preload instruction inserted therein, said first preload instruction having been inserted by a compiler at a location proximate to a first predictor construct contained in said instruction stream, said first preload instruction containing a first address for first information that will be needed by said first central processing unit, said first predictor construct being a call statement, said instruction stream also having a second preload instruction inserted therein, said second preload instruction having been inserted by a compiler at a location proximate to a second predictor construct contained in said instruction stream, said second preload instruction containing a second address for second information that will be needed by said first central processing unit.

2. A computer apparatus, said computer apparatus comprising:

a first central processing unit, said first central processing unit executing an instruction stream, said instruction stream having a first preload instruction inserted therein, said first preload instruction having been inserted by a compiler at a location proximate to a first predictor construct contained in said instruction stream, said first preload instruction containing a first address for first information that will be needed by said first central processing unit, said instruction stream also having a second preload instruction inserted therein, said second preload instruction having been inserted by a compiler at a location proximate to a second predictor construct contained in said instruction stream, said second preload instruction containing a second address for second information that will be needed by said first central processing unit, said second predictor construct is one that loads a table of contents pointer.

3. A computer implemented method, said method comprising the step of:

executing an instruction stream, said instruction stream being executed by a first central processing unit, said instruction stream having a first preload instruction inserted therein, said first preload instruction having been inserted by a compiler at a location proximate to a first predictor construct contained in said instruction stream, said first preload instruction containing a first address for first information that will be needed by said first central processing unit, said first predictor construct being a call statement, said instruction stream also having a second preload instruction inserted therein, said second preload instruction having been inserted by a compiler at a location proximate to a second predictor construct contained in said instruction stream, said second preload instruction containing a second address for second information that will be needed by said first central processing unit.

4. A computer implemented method, said method comprising the step of:

executing an instruction stream, said instruction stream being executed by a first central processing unit, said instruction stream having a first preload instruction inserted therein, said first preload instruction having been inserted by a compiler at a location proximate to a first predictor construct contained in said instruction stream, said first preload instruction containing a first address for first information that will be needed by said first central processing unit, said instruction stream also having a second preload instruction inserted therein, said second preload instruction having been inserted by a compiler at a location proximate to a second predictor construct contained in said instruction stream, said second preload instruction containing a second address for second information that will be needed by said first central processing unit, said second predictor construct is an instruction that loads a table of contents pointer.

* * * * *